Oct. 27, 1931.  S. H. KNIGHT  1,829,561
AUTOMATICALLY OPENING PARACHUTE
Filed April 2, 1928
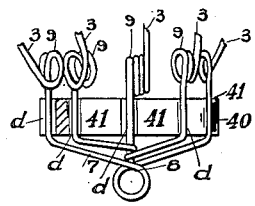
Fig. 15
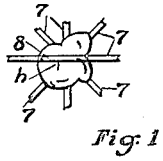
Fig. 1
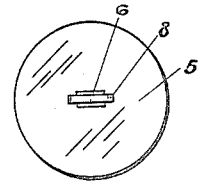
Fig. 4
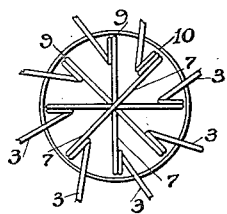
Fig. 3
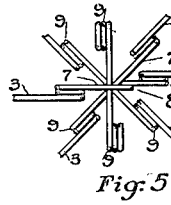
Fig. 5
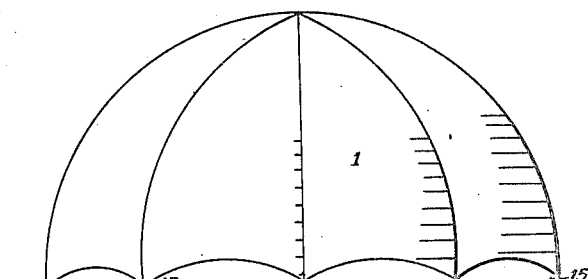
Fig. 6
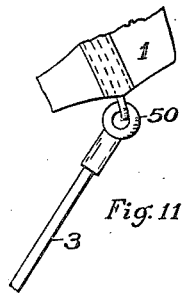
Fig. 11
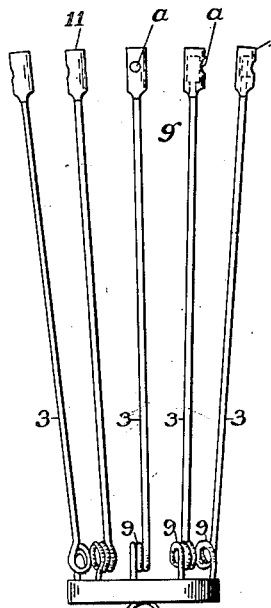
Fig. 12
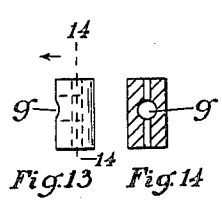
Fig. 2
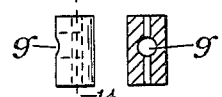
Fig. 7
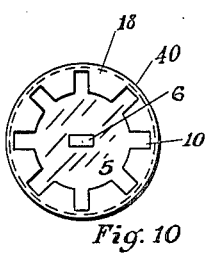
Fig. 13 Fig. 14 Fig. 10
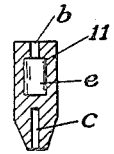
Fig. 8
Fig. 9
Inventor
Samuel H. Knight Patented Oct. 27, 1931

1,829,561

UNITED STATES PATENT OFFICE

SAMUEL H. KNIGHT, OF LANCASTER, PENNSYLVANIA, ASSIGNOR TO FOLLMER, CLOGG & CO., A CORPORATION OF NEW YORK

AUTOMATICALLY OPENING PARACHUTE

Application filed April 2, 1928. Serial No. 266,708.

Small, automatically opening parachutes are used for many purposes; they are used as auxiliary parachutes to string out a main parachute from a pack, as delivery parachutes to drop mail from a plane and for many other purposes. Quick and certain opening is requisite for many of these purposes. Simplicity of construction combined with strength and resistance to wearing through friction and an arrangement of parts that will preclude any fouling either of the parts of the parachute with each other or with a pack or container or a main parachute is very desirable; the placing of the centre of gravity of the device low, so that when the parachute is freed it will surely take a proper position is also necessary in order to assure the proper functioning of the device.

My device belongs to the type of parachutes that are spring opened; it has a series of sail-unfurling springs, that, when released, spread the parachute's sail, and which have the weight positioned below the sail, so that the parachute will right itself at once, when launched. The unfurling springs replace the suspending cords, and are formed very simply and are very compact. Few and simple mechanical parts are needed and simple tools, very few of which are special, only required and the assemblage of the parts is very readily and speedily accomplished. Parts likely to foul are shielded. The connections, between the sail and unfurling springs are a feature of the best embodiment of my device; they prevent fouling, and wear of the sheets is minimized by their construction.

Describing now the best embodiment of my invention of which I am at present aware.

Fig. 1 is a modified form of the sheet retainer. Fig. 2 is an enlarged view of the connection between the top of one of the unfurling springs and the sail. Fig. 3 is a plan view of the spring assemblage at the load carrier. Fig. 4 is a view of the bottom of the load carrier. Fig. 5 is a view of the spring assemblage at the load carrier. Fig. 6 is a sketch of the parachute. Fig. 7 is a view of the upper end of the sheet retainer. Fig. 8 is a view of the lower end of the sheet retainer. Fig. 9 is a vertical section on the line 9—9 of Fig. 2. Fig. 10 is a plan view of the shield and the spacer spacing the springs from each other. Fig. 11 is a view of a modified form of the sheet retainer. Fig. 12 is an elevation of the springing members in the positions they will occupy when the parachute is furled. Fig. 13 is a view of a modified form of the sheet retainer. Fig. 14 is a section on the line 14—14 of Fig. 13. Fig. 15 is a view of a modified form of the nesting of the springing members on an enlarged scale.

The unfurling springs, 3, 3, 3, 3, are nested together at the load carrier, and extend upward having free ends capped by the sheet retainers, 11, 11, 11, 11. These free ends can be gathered together to furl the parachute as shown in Fig. 12, and spring outward to unfurl the sail, 1, when released. Each spring has two upwardly extending arms, and a linking length, 7, that connects the oppositely lying coils, 9, running crosswise of the load carrier and springing coils, 9, 9, 9, between the parts, 7, and the upwardly extending portions of the springing arms 3. One or more of these linking portions of the load carrier may be formed into a load ring, 8; others may extend directly across the load carrier. These linking portions, 7, of the springs, 3, are nested together and the springs preferably are suitably secured to each other by soldering or other suitable means.

A shield, 10, should be provided in order to keep the lower parts of the springs from fouling with things they might come in contact with. Such a shield is illustrated particularly in Figs. 5 and 10. It has a disc, 5, pierced with the aperature 6, to allow a load ring, 8, to protrude through it, and preferably has fins, 18, that can be bent inward between the springs and over the chock piece, 40.

The free ends of the spring, 3, are capped by the sheet holders, 11, that hold the sheets, 15. These sheets extend up, in practice, adjacent to the seams between the gores of the sail, 1, underneath a reinforcement, 2, which is sewn to the sail as by rows of stitches such as are designated by the numeral, 17. The sheet holders have a channel, b, through which the sheet, 15, passes into a chamber, e, which is larger than the channel, b. A socket, c, receives the end of the spring, 3. A knot, 12, is tied in the end of the sheet, 15, that is drawn into the chamber, e, but cannot pass through the channel, b. Of course, my invention is not confined to this particular device for connecting the unfurling springs to the sail. The preferred form of spacing device is shown in Fig. 15. In this form the slotted chock plate, 40, is placed within the shield,—the abutments, 41, 41, alternating with the slots, d, d,—and serves to separate the springing sail expanders from each other. Figs. 13 and 14 show a modified form of the sheet retainer where a chamber, g, is formed merely by drilling into the side of the sheet retainer; this chamber being larger than the channel through which the sheet is passed. Fig. 11 shows a modified form of the entire fastening means for connecting the sheet to the sail expanders. Fig. 1 shows a modified form of the nesting where a soldering together of the springing sail expanders, replaces the slotted chock plate. The soldering is indicated at h.

While I have fully described a particular form of my device I do not confine myself to this particular form or limit my invention otherwise than as set forth in the claims.

I claim:

1. An automatically opening parachute in which suspending cords are replaced by sail unfurling springs in combination with the sail of the parachute, and sheets secured to said sail, of unfurling springs for said sail each having a pair of arms extending upward and springing outwardly, said arms being connected together by a linking portion integral with said arms at the lower ends of said arms, and means for attaching said sheets to the upper ends of such arms.

2. The device as defined in claim 1, in combination with this additional element, namely, a shield enclosing the said linking portions of said unfurling springs.

3. The device as defined in claim 1, wherein the means for attaching the upper ends of the arms of the unfurling springs to the sheets consist of sheet retainers that have a channel at their upper ends, a chamber back of the said channel and of a larger diameter and a socket for the end of the unfurling spring.

4. The device as defined in claim 1, wherein the various unfurling springs are rigidly secured together at their lower portions, and one of the said springs is formed into a downwardly projecting load ring.

5. The device as defined in claim 1, in combination with a shield covering the lower portions of the sail unfurling springs, the latter being rigidly secured to each other and to the shield at their lower portions.

6. The device as defined in claim 1, wherein the various unfurling springs are rigidly secured together at their lower portions, and one of the said springs is formed into a downwardly projecting load ring, and a shield enclosing the said linking portions of said unfurling springs.

7. In an automatically opening parachute in which suspending cords are replaced by sail unfurling springs, the combination with a sail, of unfurling springs for said sail, each spring comprising two upwardly extending arms, and a connecting link intermediate between said arms, all of said parts being integral with each other, and the tops of said springing arms lying adjacent to the edge of the said sail, and means for attaching said sail to the upper ends of said arms.

8. The device as defined in claim 7, wherein the said springs are nested and fastened together at their lower portions.

9. In an automatically opening parachute having a sail in which the suspending cords are replaced by sail unfurling springs, the combination with said springs of a spacing chock piece having slots in its periphery into which portions of the springs distant from the sail are received and springly held, and a shield fitting around said chock piece and enclosing the said slots.

SAMUEL H. KNIGHT.